United States Patent Office 2,962,523
Patented Nov. 29, 1960

2,962,523

PREPARATION OF ESTERS THROUGH THE ACYLATION OF OCTAHYDRO-5aH,10aH-4a,9a-EPOXY-DIBENZO-p-DIOXIN-5a,10a-DIOL

Henry C. Godt, Jr., St. Louis, Mo., assignor to Monsanto Chemical Company, St. Louis, Mo., a corporation of Delaware No Drawing. Filed July 24, 1958, Ser. No. 750,567

11 Claims. (Cl. 260—468)

This invention relates to a method of preparing enol esters and more particularly it pertains to a novel method for the preparation of 6-oxo-1-cyclohexen-1-yl esters of carboxylic acids.

The esters which can be prepared by the novel method of this invention are those having the following formula

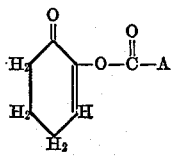

wherein A is an organic group. More specifically, A can be an open-chain derivative of an aliphatic group such as an alkyl radical, alkenyl radical, an alkylnyl radical, or a substituted aliphatic radical; A can also be a cyclic group, such as an alicyclic hydrocarbon radical or a substituted alicyclic radical; it can be a heterocyclic group, such as a five membered heterocyclic radical or a six membered heterocyclic radical, and it can be an aromatic group such as an aromatic hydrocarbon radical or a substituted aromatic radical. For example, the aliphatic radicals can be alkyl radicals, such as methyl, ethyl, isopropyl, n-butyl, n-heptyl, 2-ethylhexyl, isodecyl, octadecyl, etc.; or alkenyl radicals such as allyl, 2-butenyl, 3-pentenyl, 2-hexenyl, 4-heptenyl, etc. or alkynyl radicals such as 1-propynyl, 2-butynyl, 2-methyl-4-pentyn-3-yl, 2,5-heptadyn-3-yl, etc.; or cycloalkyl radicals such as cyclopentyl, cyclohexylmethyl, 2,6-dimethylcyclohexyl, etc.; or a heterocyclic radical such as thenyl, thienyl, furyl, furfuryl, pyranyl, pyridyl, pyrryl, piperidyl, etc.; or aryl radicals such as phenyl, tolyl, ethylphenyl, xylyl, cumyl, cymyl, xenyl, naphthyl, biphenyl, etc.; or aralkyl radicals, such as benzyl, phenylethyl, phenylpropyl, phenylbutyl, etc.

The above mentioned radicals may also be substituted by one or more substituents. Typical, but not limitative of such substituents are the halogens including chlorine, bromine, iodine and fluorine, the nitro group; non-enzolizable carbonyl group; tertiary amino groups; aliphatic, aromatic and alicyclic ether groups and other non-interfering groups as is readily understood by those skilled in the art. Thusly, those skilled in the art will readily recognize the fact that such substituents as hydroxyl, mercapto, certain active type Cl substituents, e.g. allylic type, oxime, will not be desirable since they will interfere with the acylation reaction.

The group

in the above formula will be hereinafter referred to as an acyl group or radical, since it is derived from an acylating agent such as an acyl halide or an acid anhydride. Thus, the acyl group includes such groups as the acetyl, benzoyl, nicotinoyl, naphthoyl, furoyl, imidazolylacetyl, stearoyl, chloroacetyl, p-nitrobenzoyl, p-formylbenzoyl, succinoyl, maleoyl, 2-ethylhexanoyl, camphoroyl, among others. The preferred acyl groups are the

groups wherein R is a hydrocarbon radical.

The acyl group may be derived from polycarboxylic acids including aliphatic saturated and unsaturated types and aromatic polycarboxylic acids. Where the polycarboxylic acid forms an anhydride, it is most desirable to employ the polycarboxylic acid anhydride as the acylating agent. The acyl group may also be derived from a polycarboxylic acid which has been partially esterified, i.e. acid esters containing one free carboxyl group and the other carboxyl groups have been esterified by alcohols, keto alcohols or ether alcohols, e.g. monoacetonyl phthalic acid or the monophthalyl ester of the monoethyl ether of ethylene glycol. In this case the acid chloride of the partially esterified polycarboxylic acid is used as the acylating agent.

The process of this invention is carried out simply by reacting an acylating agent, preferably an acyl halide, with octahydro-5aH,10aH-4a,9a-epoxydibenzo-p-dioxin-5a,10a-diol. The diol starting material is prepared by reacting cyclohexanol with nitric acid at a temperature below 35° C. and preferably below 20° C. This preparation is more specifically described in copending application, Serial No. 502,731, filed April 20, 1955, now U.S. Patent 2,881,215. This diol has the following structure:

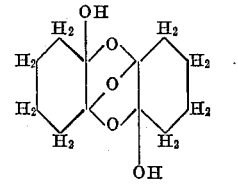

Since the reaction is exothermic in character, it is preferred to carry out the reaction in the persence of a non-aqueous, inert reaction diluent or solvent so that the heat of the reaction may be conveniently removed. When the acylating agent is an acyl halide, it is preferred to employ as the reaction diluent any basic inert solvent such as pyridine, t-butyl amine, quinoline or other tertiary amines, which react with the hydrogen halide formed during the reaction. Other reaction diluents or solvents may be used, of course, so long as a hydrogen halide acceptor is also present. When an acid anhydride is employed as the acylating agent, it can be employed in excess if it is a liquid at reaction temperatures, and thus the unreacted anhydride will function as the reaction diluent.

The process of this invention can be carried out at any temperature at which the exothermic reaction can be controlled. However, little advantage is to be gained from heating the reactants; for at room temperature the reaction progresses at a rate of reaction satisfactory for industrial application. The process of this invention can be carried out at temperatures below room temperature, e.g. below 20–25° C., if the reactants are at this temperature; however, the reactants need not be cooled to such a temperature nor does the reaction need to be maintained at such temperatures.

Stoichiometric proportions of the reactants may be used; however, it is preferred to use an excess of the acylating agent. When the acylating agent is an acyl halide and the ratio of halide to diol is 3 to 1, substantially quantitative yields of the desired enol esters are obtained.

In view of the exothermic nature of the reaction, it is desirable that the one reactant be added slowly to a solution or suspension of the other. It is more preferred to add the acylating agent to a solution or suspension of the diol reactant, wherein the solvent or suspending medium employed is a hydrogen halide acceptor. Pyridine is an exceptionally useful solvent for the process of this invention.

The compounds produced by the process of this invention can be employed as insecticides, herbicides and ultraviolet light screening agents as well as intermediates in the synthesis of other organic compounds. When employed as intermediates in the synthesis of other organic compounds, exceedingly useful end products can be prepared. For example, exceptionally useful herbicides can be prepared by the reaction of the enol esters prepared herein with hydrazines and substituted hydrazines. The enol esters themselves may be added to plasticized vinyl resin compositions to prevent the deterioration thereof due to the effect of ultraviolet light.

The following examples are intended to illustrate the process of this invention. The term "parts" is employed in the following examples to indicate parts by weight.

EXAMPLE I

There is suspended in pyridine, 2 parts of octahydro-5aH,10aH-4a,9a-epoxydibenzo-p-dioxin-5a,10a-diol with stirring While the resulting mixture is stirred, 0.5 parts of benzoyl choride are added dropwise with external cooling to maintain the reaction at about room temperature. After the initial reaction subsides, a white precipitate appears. The reaction mixture is heated on a steam bath for approximately five minutes and then cooled to room temperature. The reaction mixture is poured into ice water, while stirring and a yellow oily mass precipitates. The supernatant liquid is decanted and the yellow mass is treated twice with a 5% sodium carbonate solution. The residue is then dissolved in approximately 10 parts of pyridine and poured over ice. The precipitate is filtered and recrystallized from isopropyl alcohol. There is recovered, 2.5 parts (70% yield) of a product identified as 6-oxo-1-cyclohexen-1-yl-benzoate, having a melting point of 89 to 90° C.

Calculated for $C_{13}H_{12}O_3$: C, 72.21; H, 5.59; mol. wt. 216. Found: C, 71.87; H, 5.76; mol. wt. 221 (in acetone by Menzies ebullioscopic method).

EXAMPLE II

Employing the procedure of Example I but using 3 mols of benzoyl chloride to one mol of diol, a 97% yield of the desired benzoate is obtained.

EXAMPLE III

The procedure of Example II is repeated except that the benzoyl chloride is replaced with an equimolecular amount of 2-thenoyl chloride. There is obtained in 95% yield, 6-oxo-1-cyclohexen-1-yl-2-thenoate. This compound on recrystallization from dibutyl ether has a melting point of 100–101° C.

Calculated for $C_{11}H_{10}SO_3$: C, 59.44; H, 4.54; S, 14.43. Found: C, 59.80; H, 4.78; S, 14.48.

EXAMPLE IV

Employing the procedure of Example II but replacing the benzoyl chloride with an equimolecular amount of acetyl chloride, an excellent yield of 6-oxo-1-cyclohexen-1-yl-acetate is obtained.

Similar results are obtained when the acetyl chloride reactant is replaced with an equimolecular amount of acetic anhydride.

EXAMPLE V

The following esters of 6-oxo-1-cyclohexen-1-ol are prepared by following the procedure of Example II and replacing the benzoyl chloride of said example with an equimolecular amount of the indicated acylating agent.

Table I

Acylating agent:
(1) 2-chlorobenzoyl chloride
(2) 4-chlorobenzoyl chloride
(3) 4-methoxy benzoyl chloride
(4) 3,4-dichlorobenzoyl chloride
(5) 4-nitrobenzoyl chloride
(6) 3-nitrobenzoyl chloride
(7) phenoxyacetyl chloride

ESTERS OF 6-OXO-1-CYCLOHEXEN-1-OL

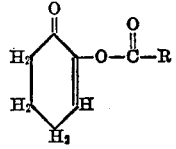

| R | Empirical Formula | M.P., ° C. | Percent Crude Yield | Recrystallized from— | Analyses ||||||||
|---|---|---|---|---|---|---|---|---|---|---|---|---|
| | | | | | Calc. |||| Found ||||
| | | | | | C | H | Cl | N | C | H | Cl | N |
| 1. 2-chlorophenyl | $C_{13}H_{11}ClO_3$ | 72–73 | 96 | Isopropanol | 62.28 | 4.42 | 14.15 | | 62.63 | 4.61 | 13.97 | |
| 2. 4-chlorophenyl | $C_{13}H_{11}ClO_3$ | 115–117 | 99 | Ethanol | 62.28 | 4.42 | 14.15 | | 62.06 | 4.47 | 14.13 | |
| 3. 4-methoxyphenyl | $C_{14}H_{14}O_4$ | 96–98 | 99 | ___do___ | 68.28 | 5.73 | | | 67.63 | 5.20 | | |
| 4. 3,4-dichlorophenyl | $C_{13}H_{10}Cl_2O_3$ | 133–135 | 99 | ___do___ | 54.76 | 3.54 | 24.87 | | 54.35 | 3.78 | 24.78 | |
| 5. 4-nitrophenyl | $C_{13}H_{11}NO_5$ | 133–134.5 | 76 | ___do___ | 59.77 | 4.25 | | 5.36 | 60.22 | 4.38 | | 4.96 |
| 6. 3-nitrophenyl | $C_{13}H_{11}NO_5$ | 123.5–125 | | Isopropanol | 59.77 | 4.25 | | 5.36 | 59.85 | 4.43 | | 5.10 |
| 7. Phenoxymethyl | $C_{14}H_{14}O_4$ | 85.5–36 | | Skellysolve E | 68.28 | 5.73 | | | 68.05 | 5.70 | | |

Other members of the class of chemical compounds produced by the process of this invention, having the formula illustrated above, are tabulated below together with the reactants required to prepare these compounds. In all these examples octahydro-5aH,10aH-4a,9a-epoxydibenzo-p-dioxim-5a,10a-diol was reacted with an acyl chloride. In Table II only the acyl chloride reactant is named.

Table II
6-Oxo-1-Cyclohexen-1-yl Esters

| Ex. No. | Acyl Chloride Reactant | Product |
|---|---|---|
| VI | propionyl chloride | 6-oxo-1-cyclohexen-1-yl propionate. |
| VII | stearoyl chloride | 6-oxo-1-cyclohexen-1-yl stearate. |
| VIII | cyclohexanecarbonyl chloride. | 6-oxo-1-cyclohexen-1-yl cyclohexanecarboxylate. |
| IX | naphthoyl chloride | 6-oxo-1-cyclohexen-1-yl naphthoate. |
| X | acryloyl chloride | 6-oxo-1-cyclohexen-1-yl acrylate. |
| XI | 6-heptenoyl chloride | 6-oxo-1-cyclohexen-1-yl 6-heptenate. |
| XII | p-toluoyl chloride | 6-oxo-1-cyclohexen-1-yl-p-toluate. |
| XIII | cyclohexaneacetyl choride | 6-oxo-1-cyclohexen-1-yl cyclohexaneacetate. |
| XIV | α-ethylidenecaproyl chloride. | 6-oxo-1-cyclohexen-1-yl α-ethylidenecaproate. |
| XV | lauroyl chloride | 6-oxo-1-cyclohexen-1-yl laurate. |
| XVI | 3-phenanthrenecarbonyl chloride. | 6-oxo-1-cyclohexen-1-yl 3-phenanthrenecarboxylate. |
| XVII | 4-quinolinecarbonyl chloride. | 6-oxo-1-cyclohexen-1-yl 4-quinoline carboxylate. |
| XVIII | methoxyacetyl chloride | 6-oxo-1-cyclohexen-1-yl methoxyacetate. |
| XIX | furoyl chloride | 6-oxo-1-cyclohexen-1-yl furoate. |
| XX | 2-ethylhexanoyl chloride | 6-oxo-1-cyclohexen-1-yl-2-ethylhexoate. |
| XXI | cyclohexyl chloro carbonate. | 6-oxo-1-cyclohexen-1-yl cyclohexyl carbonate. |

After the acylation reaction is complete, the desired enol ester may be recovered from the reaction mixture by any method well known to those skilled in the art. Preferably, the reaction mixture is poured onto ice, and if a solid results, the mixture is filtered and recrystallized. If an oily liquid settles out in the ice bath then the water is decanted off the solution and the oil is distilled.

It is understood that the above description is given by way of illustration only and not of limitation, for other embodiments of the process and products within the spirit of this invention will be obvious to those skilled in the art. For example, the precise proportions given in the foregoing examples are not critical and can be varied to suit the reaction equipment employed. Satisfactory results will be obtained, however, wherein chemical equivalent proportions of the reactants are employed.

This application is a continuation-in-part of application Serial Number 502,733, filed April 20, 1955, now abandoned.

What is claimed is:

1. The method of preparing 6-oxo-1-cyclohexen-1-yl esters having the formula

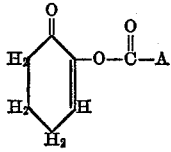

wherein A is an organic group derived from a carboxylic acid acylating agent, which comprises reacting octahydro - 5aH,10aH - 4a,9a - epoxydibenzo - p - dioxin - 5a,10a-diol with an acylating agent.

2. The process of claim 1 wherein the acylating agent is an acyl anhydride.

3. The process of claim 1 wherein the acylating agent is an acyl halide and the process is carried out in the presence of a hydrogen halide acceptor.

4. The method of preparing 6-oxo-1-cyclohexen-1-yl esters of the formula

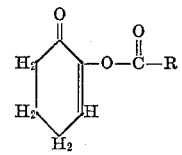

wherein R is a hydrocarbon group, which comprises reacting in a non-aqueous, inert reaction diluent octahydro - 5aH,10aH - 4a,9a - epoxydibenzo - p - dioxin - 5a,10a-diol with an acyl chloride of the formula

wherein R has the same meaning as above, in the presence of an HCl acceptor.

5. A process according to claim 4 in which the acyl chloride is added slowly to the diol.

6. A process according to claim 4 wherein the reaction is carried out in the presence of a basic inert solvent.

7. A process according to claim 6 wherein the ratio of acyl chloride to diol is 3 to 1.

8. A process according to claim 7 wherein the R group of the acyl chloride is an aryl radical.

9. A process according to claim 8 wherein the acyl chloride is benzoyl chloride and the basic inert solvent is pyridine.

10. A process according to claim 7 wherein the R group of the acyl chloride is an alkyl radical.

11. A process according to claim 7 wherein the R group of the acyl chloride is a cycloalkyl radical having from five to seven carbon atoms.

References Cited in the file of this patent

Godt et al.: J. Am. Chem. Soc., 78, 1461–4 (1956).